United States Patent
Hou et al.

(10) Patent No.: US 8,078,785 B2
(45) Date of Patent: Dec. 13, 2011

(54) HOST MODULES, ELECTRONIC DEVICES, ELECTRONIC SYSTEMS AND DATA TRANSMISSION METHOD THEREOF

(75) Inventors: Shu-Zhi Hou, Taipei County (TW); Xin-Xi Li, Taipei County (TW); Di Dai, Taipei County (TW); Zhiqiang Hui, Taipei County (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 0 days.

(21) Appl. No.: 12/334,569

(22) Filed: Dec. 15, 2008

(65) Prior Publication Data

US 2009/0228626 A1 Sep. 10, 2009

(30) Foreign Application Priority Data

Mar. 7, 2008 (CN) .......................... 2008 1 0007774

(51) Int. Cl.
*G06F 13/40* (2006.01)
(52) U.S. Cl. ........................................ 710/307; 370/476
(58) Field of Classification Search .................. 710/307, 710/311, 313–314, 66, 310; 370/476
See application file for complete search history.

(56) References Cited

U.S. PATENT DOCUMENTS

| | | | |
|---|---|---|---|
| 6,079,024 A | 6/2000 | Hadjimohammadi et al. | |
| 7,136,953 B1 | 11/2006 | Bisson et al. | |
| 7,370,132 B1 * | 5/2008 | Huang et al. | 710/307 |
| 7,657,688 B2 * | 2/2010 | Atherton et al. | 710/307 |
| 7,663,633 B1 * | 2/2010 | Diamond et al. | 345/503 |
| 2002/0146023 A1 | 10/2002 | Myers | |

OTHER PUBLICATIONS

Taiwanese language office action dated Sep. 15, 2011.

\* cited by examiner

*Primary Examiner* — Clifford Knoll
(74) *Attorney, Agent, or Firm* — Thomas|Kayden

(57) ABSTRACT

A host module is disclosed, in which an interface is used to couple to at least an electronic device through a serial bus and comprises at least first and second ports. A detection unit reports that one of the first and second ports is enabled and the other is not enabled to a serial bus host driver and enables the interface to perform data transmission with the electronic device connected to the first and second ports through two parallel transmission channels of the serial bus, when the first and second ports are both connected to the same electronic device through the serial bus.

19 Claims, 4 Drawing Sheets

HOST MODULES, ELECTRONIC DEVICES, ELECTRONIC SYSTEMS AND DATA TRANSMISSION METHOD THEREOF

CROSS REFERENCE TO RELATED APPLICATIONS

This Application claims priority of China Patent Application No. 200810007774.1, filed on Mar. 7, 2008, the entirety of which is incorporated by reference herein.

BACKGROUND OF THE INVENTION

1. Field of the Invention

The invention generally relates to an electronic device supporting serial transmission and, more particularly, to an electronic device supporting multi-port parallel transmission.

2. Description of the Related Art

Universal serial bus (USB) is a bus configured to connect a computer device and many kinds of electronic devices. Lots of computer devices and peripheral devices have USB-compatible interface. A host module can support connecting up to 127 peripheral devices via a tiered structure. A hub is located at the center of each tier, and each area-connecting wire segment is a point to point connection between a host module and a hub, a device or a hub which is connected to other hubs of devices.

Because the transmission rate of a serial advanced technology attachment (SATA) interface in an electronic device can be up to 3 Gb/s, but the transmission rate of USB interface is only up to 480 Mb/s, USB interface becomes a bottleneck of data transmission in an electronic device with SATA structure or other high speed structure.

BRIEF SUMMARY OF THE INVENTION

Embodiments of a host module are provided, in which an interface is coupled to at least an electronic device through a serial bus, and comprises at least first and second ports. A detection unit reports that one of the first and second ports is enabled and the other is not enabled to a serial bus host driver and enables the interface to perform parallel data transmission with the electronic device connected to the first and second ports via two transmission channels of the serial bus, when detecting that the first and second ports are both connected to the same electronic device via the serial bus.

The invention also provides an embodiment of an electronic device, in which an interface which comprises first and second ports, and is coupled to a host module via two serial buses, a first buffer unit is coupled to the first port and a second buffer unit coupled to the second port. A multiplexer is coupled to the first and second buffer units and a serial bus control unit is configured to enable the first and second buffer units for the electronic device to perform parallel data transmission with the host module via the two serial buses when the first and second ports are connected to the host module via the serial bus.

The invention also provides another embodiment of the electronic system, in which the electronic system comprises a first electronic device and a host module. The first electronic device comprises a first interface configured to perform data transmission via a serial bus, and wherein the first interface comprises first and second ports. The host module comprises a second interface comprising at least third and fourth ports, and a detection unit reporting that one of the third and fourth ports is enabled and the other is not enabled to a serial bus host driver and enabling the second interface to perform parallel data transmission with the first electronic device simultaneously via two transmission channels of the serial bus, when detecting that the third and fourth ports are connected to the first electronic device via the serial bus.

The invention also provides embodiments of a data transmission method of an electronic system comprising a host module of a supporting serial bus and at least a first electronic device. In the data transmission method, a first port is enabled is reported to a serial bus host driver of the host module and the first electronic device is arranged to a typical serial bus device for the host module to perform data transmission with the first electronic device via a first transmission channel of the supporting serial bus, when the first port of the host module is connected to the first electronic device. Whether a second port of the host module is connected to the first electronic device is determined when the second port of the host module is connected, and a signal to the serial bus host driver is sent to disconnect the connection between the second port and the serial bus host driver and the first electronic device is arranged to be a two-port serial bus device for the host module to perform parallel data transmission with the first electronic device simultaneously via the first and second transmission channel of the supporting serial bus, when the second port is connected to the first electronic device.

Other aspects and features of the present invention will become apparent to those ordinarily skilled in the art upon review of the following descriptions of specific embodiments of host modules, electronic devices, electronic systems and methods for data transmission.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Embodiments of this invention are related to an apparatus and a method for data transmission in an electronic system supporting serial transmission. According to a method of this invention, the electronic device supporting serial transmission can build a multi-port connection with other host devices, compatible to the conventional transmission protocol and perform data transmission via two or more parallel serial buses. Therefore, the apparatus and the method for data transmission according to this invention can substantially increase the data transmission rate of electronic systems.

The following description is of the best-contemplated mode of carrying out the invention. This description is made for the purpose of illustrating the general principles of the invention and should not be taken in a limiting sense. The scope of the invention is best determined by reference to the appended claims. In order to give better examples, the embodiments described below are utilized in electronic systems supporting USB. It could be used to teach the spirit of this invention but could not be used to limit the scope of the present invention.

Figure 1:
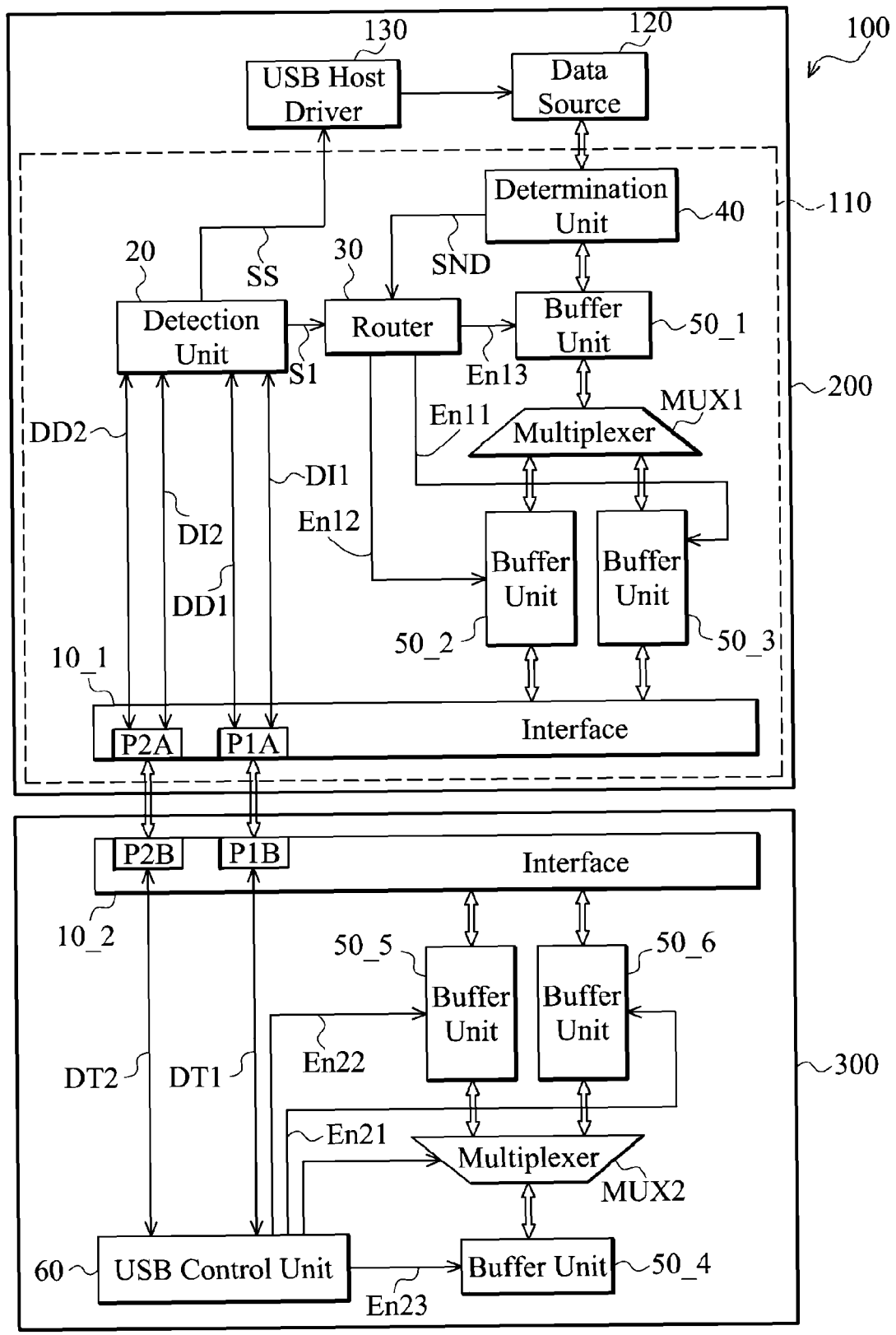
FIG. 1 is a block diagram of an electronic system according to an embodiment of the invention.

FIG. 1 is a block diagram of an electronic system according to an embodiment of the invention. As shown in FIG. 1, an electronic system 100 comprises an electronic device 200 and a connected electronic device 300 coupled to a USB host module 110 placed in the electronic device 200. The USB host module 110 comprises an interface 10_1, a detection unit 20, a router 30, a determination unit 40, buffer units 50_1~50_3, and a multiplexer MUX1. For example, the electronic device 200 is but not limited in an electronic device supporting USB, such as computers, mobile phones, personal digital assistants, and etc.

The electronic device 300 comprises an interface 10_2, buffer units 50_4~50_6, USB control unit 60, and multiplexer MUX2. For example, the electronic device 300 is but not limited in an electronic device supporting USB, such as mobile hard disks or other mass storage devices. The buffer units 50_1~50_6 may be first-in-first-out buffers. In some embodiments, the electronic devices 200 and 300 can also support any kind of serial transmission technology (or interfaces), such as serial advanced technology attachment (SATA), IEEE1394, serial peripheral interface (SPI), and etc, but are not limited to these mentioned technologies above.

The interface 10_1 in the host module 110 is a USB connection interface, and is configured to connect to one or more electronic devices via USB ports. The interface 10_1 comprises at least two ports P1A and P2A. According to the connection status (attachment or detachment) of the ports P1A and P2A in the interface 10_1, the detection unit 20 sends a corresponding port-usage signal S1 to the router 30. The port-usage signal S1 indicates at least the type of the electronic device 300 coupled to the host module 110, and the ports P1A and P2A connected to the electronic device 300. The determination unit 40 is configured to receive the data from a data source 120. When the received data is determined as a command of the USB interface 10_1, the determination unit 40 sends an inseparable signal SND to the router 30. In responsible to the inseparable signal SND, the router 30 sends the command stored in the buffer unit 50_1 directly to one of the buffer units 50_2 and 50_3. When the received data is determined not a command (the received data is a pure data), the determination unit 40 does not send an inseparable signal SND. Therefore the router 30 distributes the data stored in the buffer unit 50_1 to the buffer units 50_2 and 50_3 respectively connected to the ports P2A and P1A. According to the port-usage signal S1 from the detection unit 20 and the inseparable signal SND from the determination unit 40, the router 30 enables the buffer units 50_1-50_3 and the multiplexer MUX1 to receive or transmit data.

The interface 10_2 in the electronic device 300 is another USB connection interface connected to the host module 110, and the interface 10_2 comprises at least two ports P1B and P2B. According to the connection status (attachment or detachment) of the ports P1B and P2B in the interface 10_2, the USB control unit 60 controls the buffer units 50_4~50_6 receiving or transmitting data. The buffer units 50_5 and 50_6 are respectively coupled to the ports P2B and P1B.

When the port P1B of the electronic device 300 is connected to the port P1A of the electronic device 200 via a USB connection cable, the detection unit 20 detects it in response to a device detection signal line DD1. Then the detection unit 20 retrieves device information D11 from the electronic device 300, such as class code, device address, and etc. The detection unit 20 acknowledges that only one port of the electronic device 300 is connected to the electronic device 200 according to the device information DI1. And then the detection unit 20 sends a port-usage signal S1 to the router 30, and reports that the port P1A is enabled to a USB host driver 130 corresponding to the USB host module 110. Thus, the router 30 treats the electronic device 300 as a typical USB device (a conventional USB device supporting only single port transmission). Now, when data needs to be transmitted to the electronic device 300, the router 30 sends enabling signals En11 and En13 and only enables the buffer unit 50_1 and the buffer unit 50_3 corresponding to the port P1A. So, no matter that the data received by the determination unit 40 is a command or pure data, the data is transmitted to the buffer unit 50_3 via the buffer unit 50_1 and the multiplexer MUX1.

Similarly, when the port P1B of the electronic device 300 is connected to the port P1A of the electronic device 200, the port P1B reports that the port P1B is enabled to the USB control unit 60 via a device detection signal line DT1. Then the USB control unit 60 respectively sends enabling signals En23 and En21 to enable the buffer units 50_4 and 50_6, and transmits the data packet from the buffer unit 50_6 to the buffer unit 50_4 via the multiplexer MUX2.

Now, the interface 10_1 transmits the data stored in the corresponding buffer unit 50_3 to the electronic device 300. When the interface 10_2 receives the packet from the USB host module 110, the interface 10_2 puts the received data into the buffer unit 50_6. Under the control of the USB control unit 60, the buffer unit 50_6 puts the stored data into the buffer unit 50_4 in succession via the multiplexer MUX2. In other words, the electronic device 200 performs data transmission with the electronic device 300 via a USB transmission channel between the ports P1A and P1B.

When the port P2B of the electronic device 300 is connected to the port P2A of the electronic device 200 via another USB transmission channel (another USB connection cable), the port P2A reports that the port P2A is enabled to the detection unit 20 via a device detection signal line DD2. The port P2B also reports that the port P2B is enabled to the USB control unit 60 via a device detection signal line DT2. Thus, the detection unit 20 retrieves the device information again from the electronic device 300 to determine whether the electronic device 300 connected to the port P2A is as the same as the electronic device connected to the port P1A. Because both the ports P1A and P2A are connected to the same electronic device 300, the device information retrieved via the port P2A should be the same as the previous one via the port P1A. Therefore, the detection unit 20 determines that the device connected to the port P2A is a previously connected electronic device (the electronic device 300). Now, the detection unit 20 sends a signal SS to the USB host driver 130 to disconnect the connection between the USB host driver 130 and the port P2A for avoiding the USB host driver 130 error. At the same time, the detection unit 20 sends a port-usage signal S1 to report to the router 30 that the electronic device 300 is also connected to the host module 110 via the port P2A.

Thus, the router 30 takes the electronic device 300 as a two-port USB device, and sets a port index corresponding to the ports P1A and P2A to illustrate the connection between the ports P1A and P2A of the host module 110 and the electronic device 300. For example, by designating a port index D1_1 for the port P1A and setting a port index D1_2 for the port P2A, the router 30 acknowledges that there are two ports simultaneously connected to the electronic device 300, and the port P1A is earlier connected to the electronic device 300 than the port P1B. In this embodiment of the invention, the port index D11 represents that both commands and data can be transmitted via the designated port, and the port index D1_2 represents that the port can merely transmit the data via two-port transmission but can not transmit the command. When the determination unit 40 determines that the received data is a command, the determination unit 40 sends an inseparable signal to the router 30. According to the port index, the router 30 sends the enabling signals En11 and En13, and puts the command received by the determination unit 40 completely into the buffer unit 50_3. When the determination unit 40 determines that the received data is pure data, the determination unit 40 does not send an inseparable signal SND. According to the port index provided by the detection unit 20, the router 30 sends the enabling signals En11~En13 to enable the buffer units 50_1~50_3, and transmits the data from the buffer unit 50_1 to the buffer units 50_2 and 50_3 via the multiplexer MUX1.

In this embodiment of the invention, in order to implement the parallel data transmissions, the router 30 takes turn to send effective enabling signals En11 and En12, and sends the enabling signal En11 first. For example, in case that the size of the data stored in the buffer unit 50_1 is 4 words, and 1 word data would be sent each time, the router 30 first sends the enabling signal En11 for putting the first word data which is first sent from the multiplexer MUX1 into the buffer unit 50_3. Following, the router 30 turns off the enabling signal En11, sends the enabling signal En12, and puts the second word data sent from the multiplexer MUX1 into the buffer unit 50_2. The router 30 repeats these operations, and in next iteration, it puts the third word data into the buffer unit 50_3, and puts the fourth word data into the buffer unit 50_2 in sequence. Thus, the router 30 evenly separates the data stored in the buffer unit 50_1 and sequentially puts the data into the corresponding buffer units 50_2 and 50_3. In this embodiment of the invention, the size of each data chunk sent from the buffer unit 50_1 is but not limited in 1 word (WD).

The interface 10_1 transmits the data stored in the buffer units 50_2 and 50_3 to the electronic device 300. When the data from the host module 110 is a command, the electronic device 300 also transmits it using single port path. The USB control unit 60 receives the command from the host module 110 via the port P1B, the buffer unit 50_6, the multiplexer MUX2 and the buffer unit 50_4. When the data from the host module 110 is a pure data, the electronic device 300 sends the enabling signals En21 and En22 to enable the buffer unit 50_6 and 50_5 for parallel receiving the data by two ports. For example, when the electronic device 300 needs to transmit the data which size is 4 words to the host module 110, the buffer unit 50_6 receives the first and third word data via the port P1B, and the buffer unit 50_5 receives the second and fourth word data via the port P2B. Following the USB control unit 60 responsively controls the multiplexer MUX2 to transmit the data sequentially selected from the first word data to the fourth word data in original order. Thus, the data transmitted in parallel can be completely put into the buffer unit 50_4 and is received in original sequence as before. In other words, the electronic device 200 performs data transmission with the electronic device 300 via two USB transmission channels (the ports P1A, P1B, P2A, and P2B).

When the interface 10_1 detects that the connection between the port P2A and the port P2B is disconnected in one example, the interface 10_1 determines which port of the two-port connected device is disconnected, and sends a signal which indicates that the port P2A is disconnected to the router 30. The router 30 removes the port index and rearranges the electronic device 300 as a typical USB device. In other words, the router 30 now only sends the enabling signal En11 and En13 to enable the buffer unit 50_1 and 50_3 and transmits the data from the buffer unit 50_1 to the buffer unit 50_3 via the multiplexer MUX1.

Figure 2:
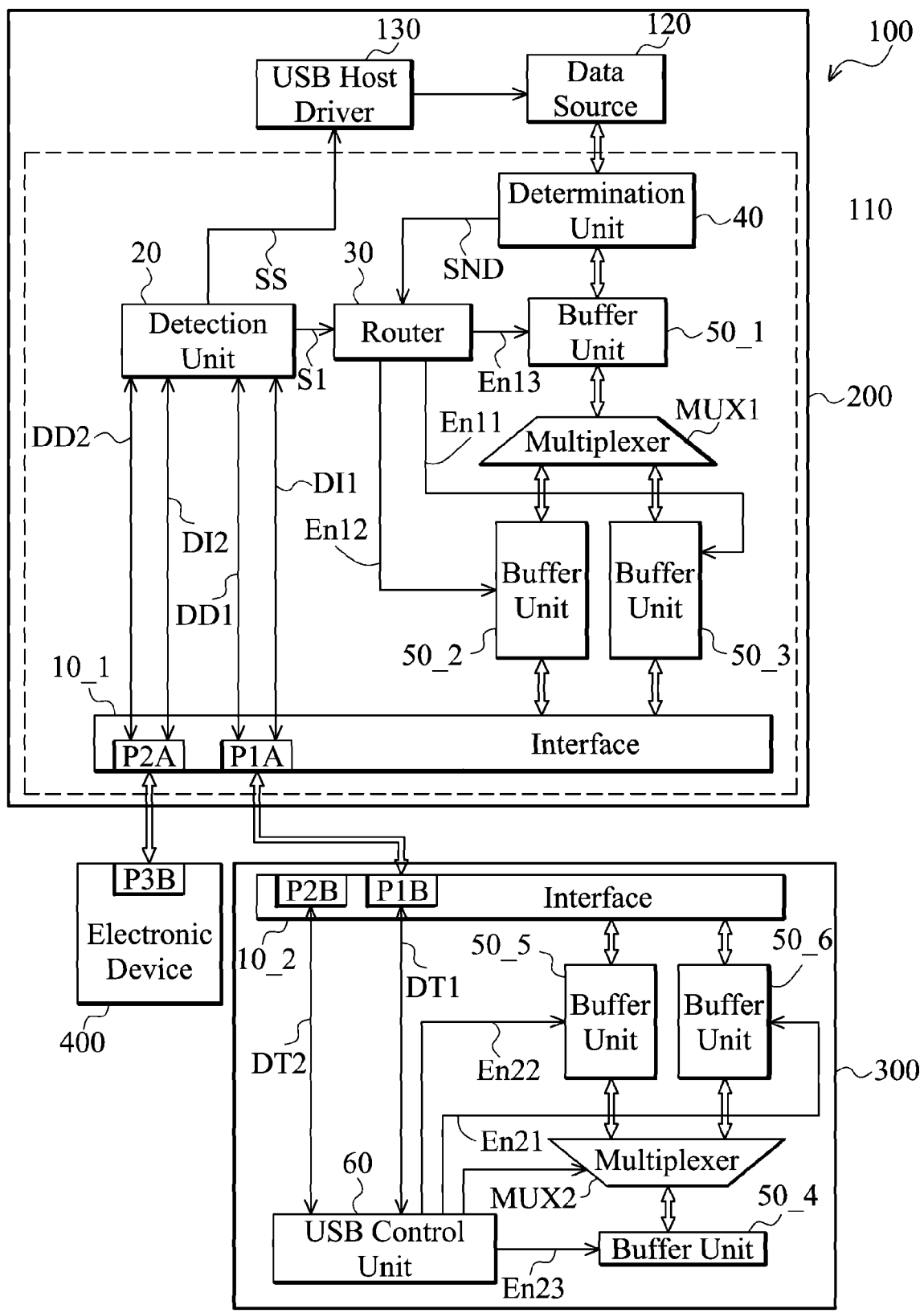
FIG. 2 is a block diagram of an electronic system according to another embodiment of the invention.

On the contrary, as shown in FIG. 2, when the device connected to the port P2A of the electronic device 200 is another new device 400 rather than the already connected electronic device 300, the detection unit 20 retrieves the device information and acknowledges that the electronic device 400 is not the device which has been already connected to the host module 110 (the electronic device 300), and reports that the port P2A is enabled to the USB host driver 130. Usually, when the host module 110 is connected with several USB devices, the router 30 acknowledges that which device the data of the data source 120 should be transmitted to by the software. So, when data needs to be transmitted to the electronic device 400 which is a single port transmission device, the router 30 sends the enabling signals En13 and En12 to enable the buffer unit 50_1 and 50_2, and transmits the data to the electronic device 400 via the port P2A. In other words, the new electronic device 400 performs data transmission whit the electronic device 200 via another USB transmission channel (the ports P2A and P3B).

The host module of this invention can be connected and performs data transmission simultaneously to the same device via more ports for increasing transmission rate.

Figure 3:
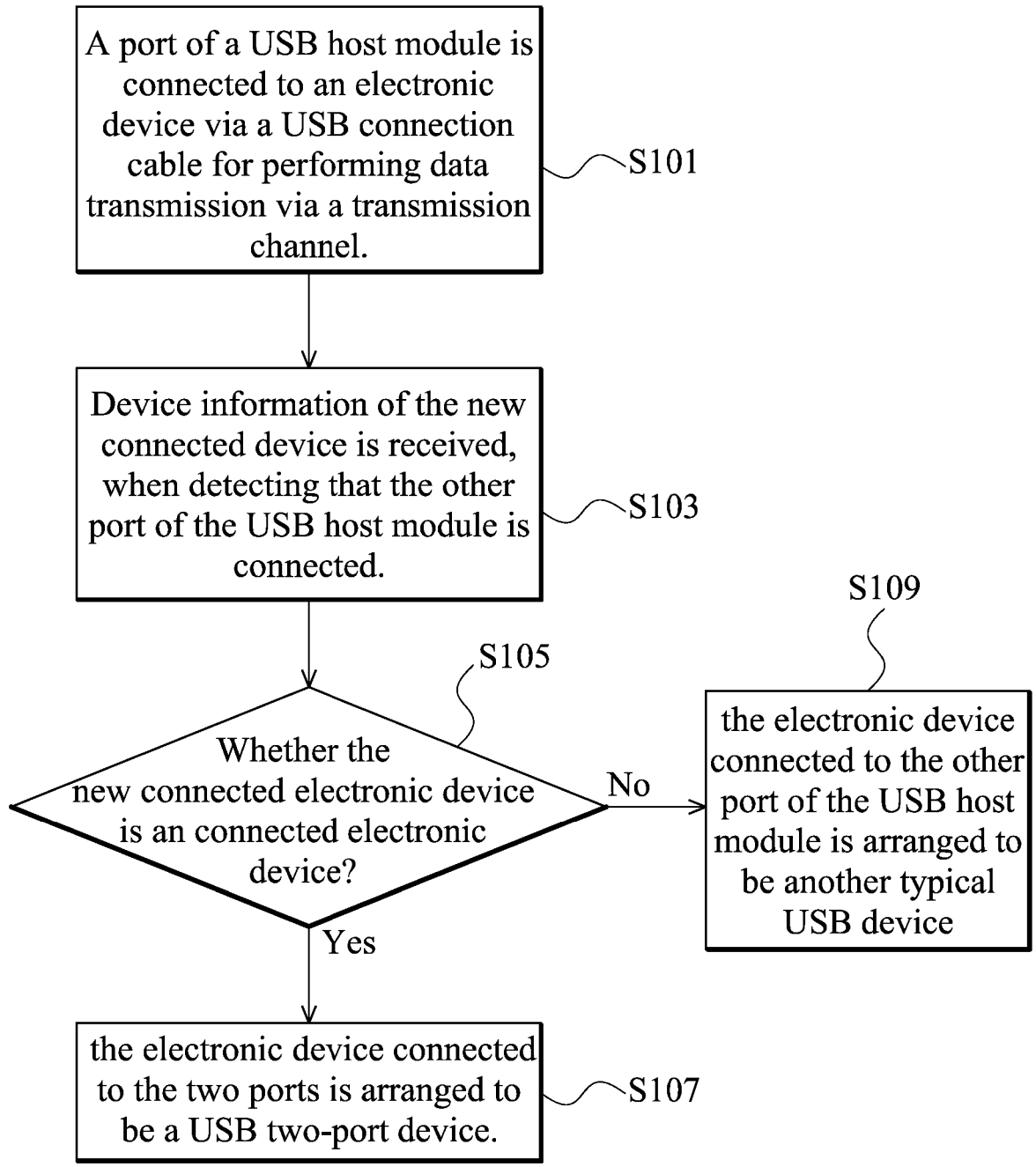
FIG. 3 is a flowchart of a transmission method according to an embodiment of the invention.

This invention also provides an embodiment of a transmission method using the USB interface of an electronic system. FIG. 3 is a flowchart of a transmission method according to an embodiment of the invention.

In step S101, a port P1A of a USB host module 110 is connected to an electronic device 300 via a USB connection cable for performing data transmission via a transmission channel. For example, when a port P1B of the electronic device 300 is connected to a port P1A of a USB host module 110 via the USB connection cable, an interface 10_1 reports it to a detection unit 20 via a device detection signal line DD1. The detection unit 20 retrieves device information D11 from the electronic device 300, such as class code, device address, and etc, sends a port-usage signal S1 to a router 30 according to the retrieved device information, and reports that the port P1A is enabled to a USB host driver 130.

No matter that a determination unit 40 determines that the received data is a command or data, the detection unit 20 controls the router 30 to send enabling signals En11 and En13 to enable buffer units 50_1 and 50_3, and to transmit the data from the buffer unit 50_1 to the buffer unit 50_3 via a multiplexer MUX1.

Similarly, when the port P1B of the electronic device 300 is connected to the port P1A of an electronic device 200, an interface 10_2 reports that the port P1B is enabled to a USB control unit 60 via a device detection signal line DT1. The USB control unit 60 then sends enabling signals En21 and En23 to enable buffer units 50_4 and 50_6, and transmits the data from the buffer unit 50_6 to the buffer unit 50_4 via a multiplexer MUX2.

The interface 10_1 transmits the data stored in the buffer unit 50_3 to the electronic device 300. When the interface 10_2 receives the data from the USB host module 110, the interface 10_2 puts the received data into the buffer unit 50_6. Under the control by the USB control unit 60, the buffer unit 50_6 puts the stored data into the buffer unit 50_4 in succession via the multiplexer MUX2. In other words, the electronic device 200 performs data transmission with the electronic device 300 via a USB transmission channel (the ports P1A and P1B).

In step S103, device information D12 of the new connected device is received when detecting that the other port P2A of the USB host module 110 is connected. For example, when a port P2B of the electronic device 300 is connected to a port P2A of the USB host module 110 via the USB connection cable, the interface 10_1 detects an increase of the connected ports. So, the interface 10_1 reports the increasing to the detection unit 20 via a device detection signal cable DD2, and retrieves the device information from the electronic device 300. When another new electronic device (such as the electronic device 400 shown in FIG. 2) is connected to the port P2A of the USB host module 110, the detection unit 20 also retrieves the device information D12 form the new electronic device.

Then, in step S105, whether the electronic device connected to the port P2A of the USB host module 110 is an already connected electronic device is determined. For example, according to the retrieved device information D12, the detection unit 20 determines whether the electronic device connected to the port P2A is a connected electronic device. When both the ports P1A and P2A are connected to the electronic device 300, the retrieved device information D12 should be the same as the device information DI1. Thus, the detection unit 20 determines that the electronic device connected to the port P2A now is the connected electronic device (the electronic device 300), and the flow goes to step S107. On the contrary, when the retrieved device information D12 is different form the device information D11, the detection unit 20 determines that the electronic device connected to the port P2A of the host module 110 is another new electronic device but not the connected electronic device 300, and the step S109 would be performed in consequence.

In step S107, the electronic device 300 connected to the ports P1A and P2A is arranged to be a USB two-port device. For example, the detection unit 20 sends a port-usage signal S1 to the router 30. According to the received port-usage signal S1, the router 30 determines that the electronic device connected to the ports P1A and P2B is a two-port transmission device, and sets port indexes corresponding to the ports P1A and P2A. According to the port index, the router 30 sends the enabling signals En11~En13 to enable the buffer units 50_1~50_3, and transmits the data packet from the buffer unit 50_1 to the buffer units 50_2 and 50_3 via the multiplexer MUX1. For example, when the size of the data stored in the buffer unit 50_1 is 4 words, and 1 word data could be sent each time, the router 30 first sends the enabling signal En11 for putting the first word data which is first sent from the multiplexer MUX1 into the buffer unit 50_3. Following, the router 30 turns off the enabling signal En11 and sends the enabling signal En12, and puts the second word data sent from the multiplexer MUX1 into the buffer unit 50_2. The router 30 repeats these operations, and puts the third word data into the buffer unit 50_3, and puts the fourth word data into the buffer unit 50_2. Thus, the router 30 separates the data stored in the buffer unit 50_1 and sequentially puts the data into the corresponding buffer units 50_2 and 50_3. In this embodiment of the invention, the size of each data sent from the buffer unit 50_1 is but not limited in 1 word (WD).

The interface 10_1 can transmit the data packet stored in the buffer units 50_2 and 50_3 to the electronic device 300. When receiving the data from the host module 110, the interface 10_2 puts the received data into the buffer units 50_5 and 50_6. The USB control unit 60 puts the data stored in the buffer units 50_5 and 50_6 sequentially into the buffer unit 50_4 via the multiplexer MUX2. In other words, the host module 110 performs data transmission with the electronic device 300 simultaneously via two USB transmission channels.

In step S109, the electronic device connected to the port P2A of the USB host module 110 is arranged to be a typical USB device. For example, the detection unit 20 takes the new electronic device as another typical USB device, and reports that the port P2A is enabled to the USB host driver 130. In other words, the new electronic device performs data transmission with the USB host module 110 via another USB transmission channel (the ports P2A and P3B).

Figure 4:
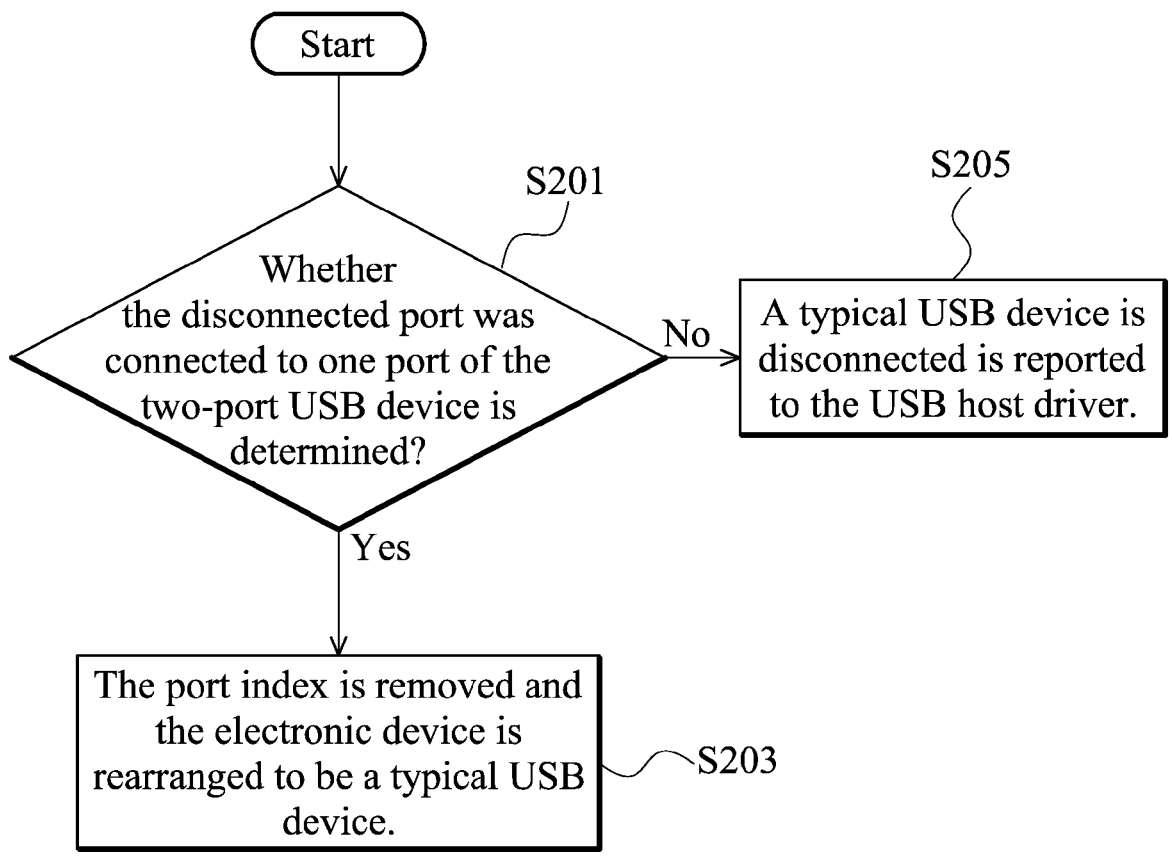
FIG. 4 is a flowchart of a transmission method according to another embodiment of the invention.

FIG. 4 is a flowchart of a transmission method according to another embodiment of the invention.

In step S201, when detecting a port is disconnected, whether the disconnected port was connected to one port of the two-port USB device is determined. When the disconnected port was connected to one port of the two-port USB device, the step S203 is performed accordingly; otherwise, when the disconnected port is not connected to one port of the two-port USB device, the step S205 is performed. For example, when the interface 10_1 detects that the connection between the ports P2A and P2B is disconnected, the interface 10_1 sends a corresponding signal to inform the detection unit 20.

In the step S203, according to the port disconnection signal sent from the detection unit 20, the router 30 removes the port index and rearranges the electronic device to be a typical USB device. For example, when the connection between the ports P2A and P2B is disconnected, the detection unit 20 sends a signal which indicates that the port P2B is disconnected to inform the router 30 that only one port of the electronic device 300 is connected. So the router 30 only sends the enabling signals En11 and En 13 to enable the buffer units 50_1 and 50_3, and transmits the data packet from the buffer unit 50_1 to the buffer unit 50_3 via the multiplexer MUX1.

In step S205, a typical USB device is disconnected is reported to the USB host driver. For example, if the port P2A is not connected to the electronic device 300 but another electronic device, when the port P2A is disconnected, the detection unit 20 reports that the typical USB device which was connected to the port P2A is disconnected to the USB host driver 130, and enables the router 30 to only turn off the enabling signal En12 to turn off the buffer unit 50_2.

In the embodiment described above, although the invention is explained with a two-port module and a two-port device, actually the number of the ports could be more than two, and there could be more than two parallel transmission channels between the host module and the electronic device for increasing the data transmission rate of the system.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A host module, comprising:
   an interface for connecting a serial bus, and comprising at least a first port and a second port; and
   a detection unit for reporting that only the first port is enabled to a serial bus host driver and enabling the interface to perform parallel data transmission with an electronic device connected to the first and second ports via two transmission channels of the serial bus when detecting that the first and second ports are both connected to the electronic device, and reporting that the first and second ports are enabled to the serial bus host driver and enabling the interface to perform serial data transmission with the electronic devices connected to the first and second ports via two transmission channels of the serial bus when detecting that the first and second ports are connected to different electronic devices.

2. The host module of claim 1, wherein when the second port is disconnected to the electronic device, the detection unit enables the interface to perform data transmission with the electronic device connected to the first port via only a transmission channel of the serial bus.

3. The host module of claim 1, further comprising:
a first buffer unit and a second buffer unit respectively coupled to the first and second ports;
a multiplexer coupled to the first and second buffer units; and
a router, coupled to the detection unit, for enabling the first or second buffer units according to a signal from the detection unit such that the multiplexer transmits data from a third buffer unit to the first or the second buffer unit, or transmits data from the first or the second buffer unit to the third buffer unit.

4. The host module of claim 1, wherein the detection unit receives a first device information when the first port is connected, receives a second device information when the second port is connected, and determines that the first and second ports are connected to the same electronic device when the first device information and the second device information are the same.

5. The host module of claim 4, wherein the detection unit reports that the second port is enabled to the serial bus host driver when the first device information and the second device information are different.

6. The host module of claim 3, further comprising a determination unit configured to determine whether information from an external data source is a command for the serial bus, and configured to send an inseparable signal to the router when the information from the external data source is a command, such that the router enables only the first buffer unit in response to the inseparable signal.

7. The host module of claim 3, wherein the first, second, and third buffer units are first-in-first-out buffers.

8. An electronic device, comprising:
an interface comprising a first port and a second port, and for connecting a host module via two serial buses;
a multiplexer coupled to the first port and the second port; and
a serial bus control unit configured to control the electronic device to perform parallel data transmission with the host module via the two serial buses when the first and second ports are connected to the host module via the two serial buses,
wherein the two serial busses are compatible of an universal serial bus interface, an serial advanced technology attachment interface or an IEEE1394 interface.

9. The electronic device of claim 8, further comprising: a first buffer unit coupled to the first port, and a second buffer unit coupled to the second port, wherein the first and second buffer units are first-in-first-out buffers.

10. The electronic device of claim 9, wherein when the second port is disconnected to the host module, the serial bus control unit disables the second buffer unit, and enables the interface to perform data transmission with the host module connected to the first port via only a transmission channel of the two serial buses.

11. The electronic device of claim 8, wherein the electronic device is a mobile hard disk.

12. An electronic system, comprising:
a first electronic device comprising a first interface, and configured to perform data transmission via a serial bus, and wherein the first interface comprising a first port and a second port; and
a host module, comprising:
a second interface comprising at least a third port and a fourth port; and
a detection unit for reporting that only the third port is enabled to a serial bus host driver and enabling the second interface to perform parallel data transmission with the first electronic device simultaneously via two transmission channels of the serial bus when detecting that the third and fourth ports are connected to the first electronic device via the serial bus, and reporting that the first and second ports are enabled to the serial bus host driver and enabling the interface to perform serial data transmission with the electronic devices connected to the first and second ports via two transmission channels of the serial bus when detecting that the first and second ports are connected to different electronic devices.

13. The electronic system of claim 12, wherein the host module further comprising:
a first buffer unit and a second buffer unit respectively coupled to the third and fourth ports;
a first multiplexer coupled to the first and second buffer units; and
a router, coupled to the detection unit, for enabling the first or second buffer units according to a signal from the detection unit such that the first multiplexer transmits data from a third buffer unit to the first or the second buffer unit, or transmits data from the first or the second buffer unit the third buffer unit.

14. The electronic system of claim 12, wherein the detection unit reports that the third and fourth ports are both enabled to the serial bus host driver when the third port is connected to the first electronic device and the fourth port is connected to a second electronic device.

15. The electronic system of claim 12, wherein the first electronic device further comprising:
a fourth buffer unit coupled to the first port;
a fifth buffer unit coupled to the second port;
a second multiplexer coupled to the fourth buffer unit and the fifth buffer unit; and
a serial bus control unit configured to enable the fourth and fifth buffer units when the first and second ports are connected to the host module via the serial bus, so that the first electronic device performs data transmission with the host module via the two transmission channels of the serial bus.

16. The electronic system of claim 12, wherein the first electronic device is a mobile hard disk, and the serial bus is compatible of at least one of an universal serial bus interface, a serial advanced technology attachment interface, an IEEE1394 interface, and a serial peripheral interface.

17. A data transmission method of an electronic system, wherein the electronic system comprising a host module capable of connecting to a serial bus and at least a first electronic device, comprising:
reporting that a first port is enabled to a serial bus host driver of the host module and treating the first electronic device as a typical serial bus device, when the first port of the host module is connected to the first electronic device, so that the host module performs data transmission with the first electronic device via a first transmission channel of the serial bus;
determining whether a second port of the host module is connected to the first electronic device when the second port of the host module is connected;
sending a signal to the serial bus host driver when the first and second ports are connected to the first electronic device in order to disconnect the connection between the second port and the serial bus host driver, and arranging the first electronic device to be a two-port serial bus device, so that the host module performs parallel data transmission with the first electronic device simultaneously via the first transmission channel and a second transmission channel of the serial bus; and reporting that the second port is enabled to the serial bus host driver and treating a second electronic device as an another typical serial bus device, when the first and second ports are connected to the first and second electronic devices respectively, so that the host module performs data transmission with the first electronic device via the first transmission channel of the serial bus and performs data transmission with the second electronic device via the second transmission channel of the serial bus.

18. The data transmission method of the electronic system of claim 17, further comprising:

rearranging the first electronic device to be a typical serial bus device and enabling the host module to perform data transmission with the first electronic device via only the first transmission channel of the serial bus, when the connection between the second port and the first electronic device is disconnected.

19. The data transmission method of the electronic system of claim 17, further comprising:

distributing the data to be transmitted to the first electronic device to two buffer units corresponding to the first and second ports and enabling the host module to perform data transmission with the first electronic device simultaneously via the first and second ports, when the first and second ports are both connected to the first electronic device.

* * * * *